US010884325B2

(12) United States Patent
Chien et al.

(10) Patent No.: US 10,884,325 B2
(45) Date of Patent: Jan. 5, 2021

(54) PROJECTION DEVICE (71) Applicant: Coretronic Corporation, Hsin-Chu (TW)

(72) Inventors: Wei-Min Chien, Hsin-Chu (TW); Jhih-Hao Chen, Hsin-Chu (TW); Tsung-Ching Lin, Hsin-Chu (TW); Shi-Wen Lin, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/703,884

(22) Filed: Dec. 5, 2019

(65) Prior Publication Data
US 2020/0183263 A1 Jun. 11, 2020

(30) Foreign Application Priority Data

Dec. 6, 2018 (CN) .......................... 2018 1 1486316

(51) Int. Cl.
*G03B 21/16* (2006.01)
*G03B 21/14* (2006.01)
*H04N 9/31* (2006.01)
*G03B 21/20* (2006.01)

(52) U.S. Cl.
CPC ......... *G03B 21/145* (2013.01); *G03B 21/142* (2013.01); *G03B 21/16* (2013.01); *G03B 21/2013* (2013.01); *H04N 9/3144* (2013.01)

(58) Field of Classification Search
CPC .. G03B 21/16; G03B 21/145; H04N 9/31244; H04N 9/3141; H04N 9/3144
USPC ............................................. 353/61
See application file for complete search history.

(56) References Cited

U.S. PATENT DOCUMENTS

2006/0132728 A1* 6/2006 Kim ....................... H04N 9/317
353/119

FOREIGN PATENT DOCUMENTS

TW  I501017 B  9/2015
TW  I591419 B  7/2017

* cited by examiner

*Primary Examiner* — Ryan D Howard (57) ABSTRACT

A projection device includes: a light source module for generating an illumination beam; an optical engine module disposed on a transmission path of the illumination beam for forming an image beam; a projection lens disposed on a transmission path of the image beam for projecting the image beam to an outside of the projection device; and a housing having opposite bottom and top portions, and a side wall connected between and surrounding the portions and having an air inflow region adjacent to the bottom portion and an air exhaust region adjacent to the top portion. The light source module, the optical engine module and the projection lens are disposed in the housing adjacent to the top portion, wherein the image beam is projected to the outside toward the bottom portion. The projection device of the invention can effectively dissipate heat.

13 Claims, 7 Drawing Sheets

PROJECTION DEVICE

CROSS-REFERENCE TO RELATED APPLICATION

This application claims the priority benefit of (CN201811486316.0,), filed on (2018 Dec. 6), access code of DAS is: C73F. The entirety of the above-mentioned patent application is hereby incorporated by reference herein and made a part of this specification.

FIELD OF THE INVENTION

The invention relates to a projection device, and more particularly to a projection device that can dissipate heat by convection of heat.

BACKGROUND OF THE INVENTION

A projection device is a device that projects an image onto a projection screen for presentation to a user. The projection device processes an illumination beam provided by a light source module into an image beam by the optical engine module, and then projects the image beam onto the projection screen by a projection lens to form an image on the projection screen. The optical engine module, the light source module and the projection lens often generate heat during operation, and the heat easily affects the functions of components of the optical engine module, the light source module and the projection lens, resulting in a degradation of the projected image quality. Furthermore, heat is likely to cause damage to these components. Moreover, the heat generated may also cause inconvenience to the user during operation.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a projection device capable of effectively dissipating heat through convection of heat.

The invention provides a projection device capable of effectively dissipating heat through natural convection of heat.

Other advantages and objects of the invention may be further illustrated by the technical features broadly embodied and described as follows.

In order to achieve one or a portion of or all of the objects or other objects, an embodiment of the invention provides a projection device including a light source module, an optical engine module, a projection lens and a housing. The light source module is adapted to emit an illumination beam. The optical engine module is disposed on a transmission path of the illumination beam and adapted to receive the illumination beam and form an image beam. The projection lens is disposed on a transmission path of the image beam, and is configured to receive the image beam and project the image beam to the outside of the projection device. The housing has a bottom portion, a top portion opposite to the bottom portion and a side wall connected between the bottom portion and the top portion. The side wall surrounds the top portion and the bottom portion and has an air inflow region adjacent to the bottom portion and an air exhaust region adjacent to the top portion. The light source module, the optical engine module and the projection lens are disposed in the housing and the light source module, the optical engine module and the projection lens are adjacent to the top portion, wherein the projection lens projects the image beam to the outside of the projection device toward the bottom portion of the housing.

Based on the above, embodiments of the invention have at least one of the following advantages or effects. In the projection device of the embodiment of the invention, by providing an air inflow region adjacent to the bottom portion and an air exhaust region adjacent to the top portion, the heat convection principle can be effectively utilized for dissipating heat, thereby avoiding the problem of optical quality degradation, component damage, or the like, caused by heat.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
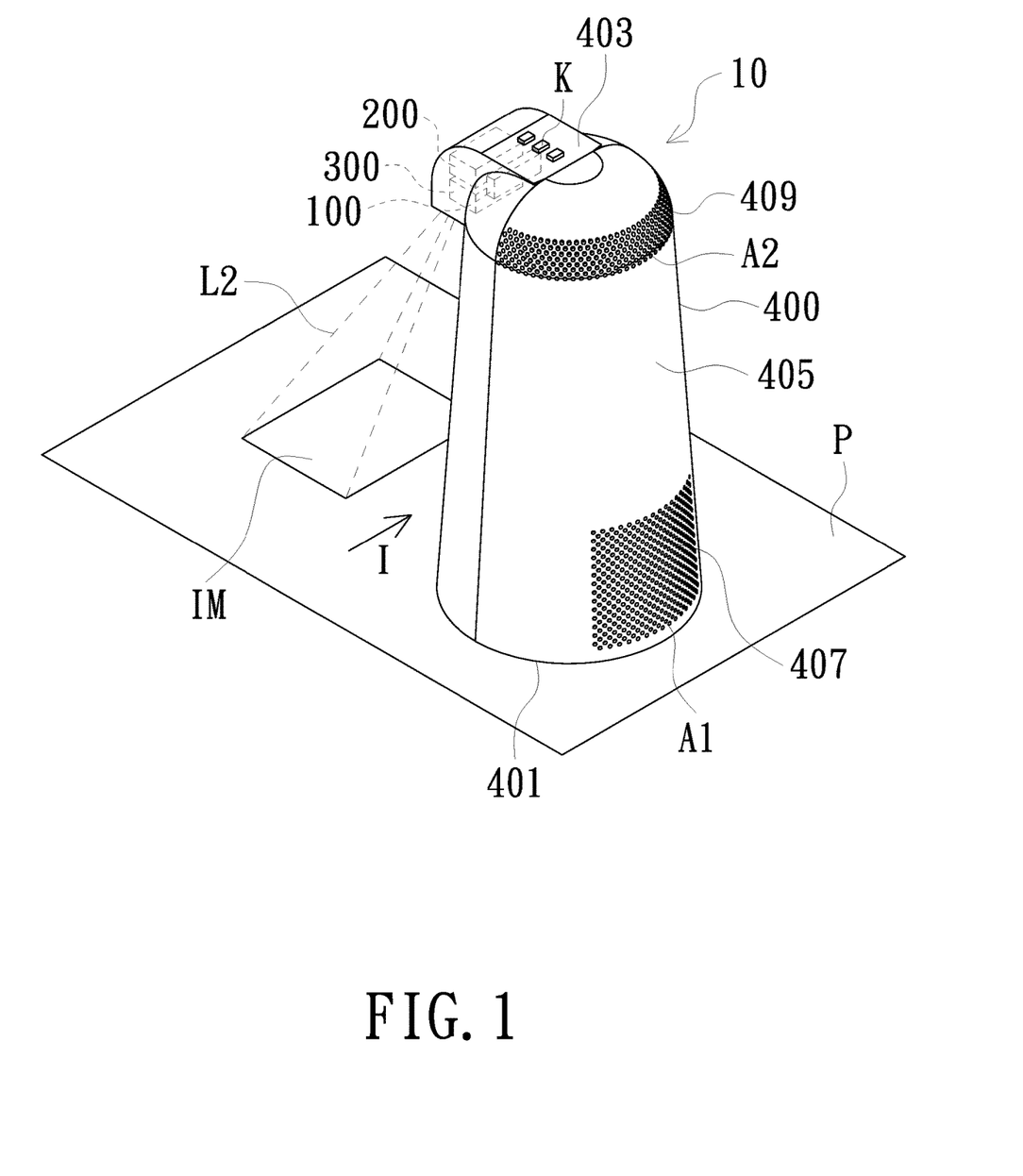
FIG. 1 is a schematic diagram of a projection device according to an embodiment of the invention.

Please refer to FIG. 1. FIG. 1 is a schematic diagram of a projection device according to an embodiment of the invention. The projection device 10 includes a light source module 100, an optical engine module 200, a projection lens 300 and a housing 400. The housing 400 of the projection device 10 has an air inflow region 407 adjacent to the bottom portion and an air exhaust region 409 adjacent to the top portion. The projection lens 300 of the projection device 10 can project an image beam L2 to the outside of the projection device 10 toward the bottom portion of the housing 400. In the other words, the projection lens 300 of the projection device 10 can project an image beam L2 to the outside of the projection device 10 along a direction from the top portion to the bottom portion of the housing 400. In the embodiment, the projection device 10 can be, for example, placed on a desktop P, and an image IM can be projected on the desktop P when the projection device 10 projects the image beam L2 toward the bottom portion of the housing 400. As such, users can read, browse and/or watch videos on the desktop P conveniently.

In the embodiment, the air inflow region 407 of the projection device 10 adjacent to the bottom portion allows air to enter, and the air exhaust region 409 adjacent to the top portion allows air to exit. When the projection device 10 is in operation, the components, such as the light source module 100, generate heat to heat the air inside the housing 400. Due to the natural convection of heat, high temperature gas flows upward. Therefore, the internal high temperature gas generated during the operation of the projection device 10 can exit from the air exhaust region 409 adjacent to the top portion, and the air outside the projection device 10 can enter through the air inflow region 407 adjacent to the bottom portion. As such, by using the natural convection principle of heat, the embodiment achieves improved heat dissipation effect without being provided with a heat dissipating fan. Therefore, not only the noise generated by the heat dissipating fan can be avoided and the cost can be reduced, but also the maintenance and damage of the heat dissipating fan can be avoided.

The desktop P of the embodiment is merely an example and is not intended to limit the invention. Any surface can be adopted as long as the projection device 10 can project an image onto it for the user to view.

Figure 2:
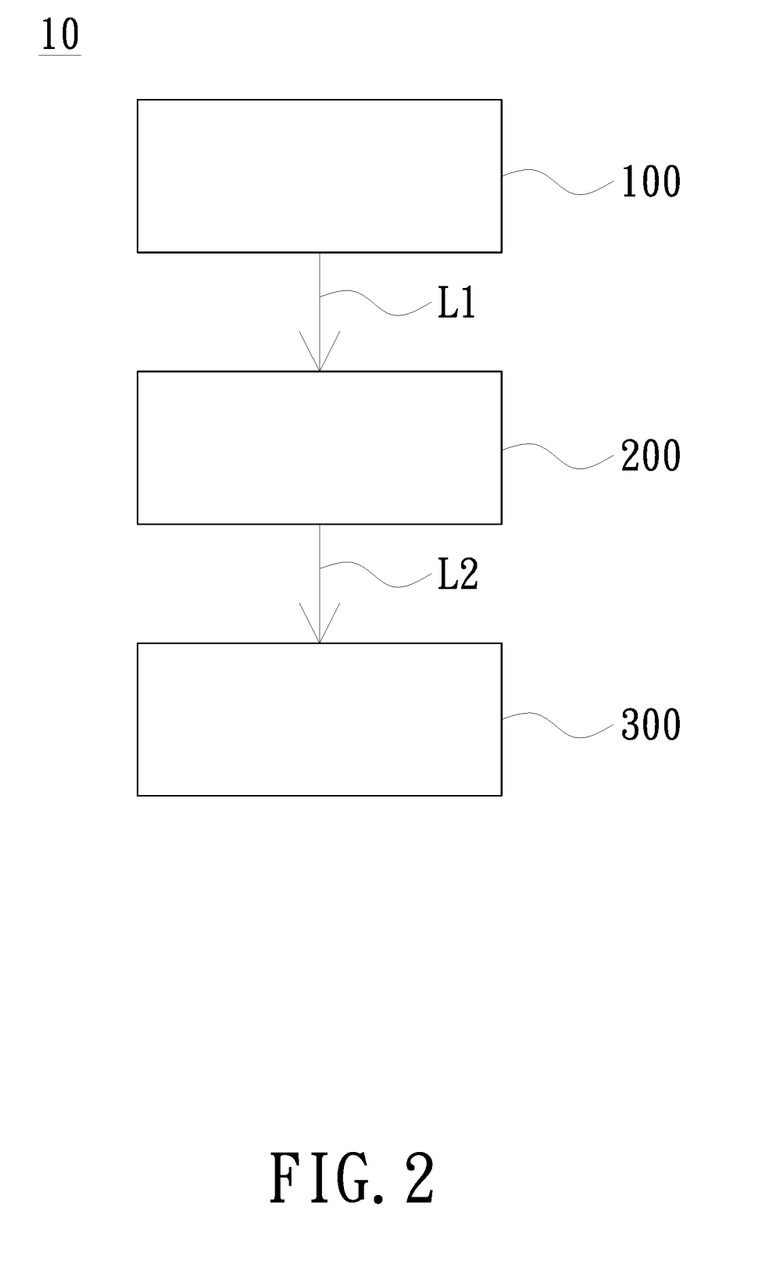
FIG. 2 is a schematic function block diagram of a projection device according to an embodiment of the invention.

Please also refer to FIG. 2. FIG. 2 is a schematic functional block diagram of a projection device according to an embodiment of the invention. The projection device 10 includes a light source module 100, an optical engine module 200, a projection lens 300 and a housing 400. The light source module 100 is used for generating an illumination beam L1. The optical engine module 200 is disposed on a transmission path of the illumination beam L1 for receiving the illumination beam L1 and forming the image beam L2. The projection lens 300 is disposed on a transmission path of the image beam L2 for receiving the image L2 and projecting the image beam L2 to the outside of the projection device 10. As shown in FIG. 1, the housing 400 has a bottom portion 401, a top portion 403 opposite to the bottom portion 401 and a side wall 405 connected between the bottom portion 401 and the top portion 403. The side wall 405 surrounds the top portion 403 and the bottom portion 401, and the side wall 405 has an air inflow region 407 adjacent to the bottom portion 401 and an air exhaust region 409 adjacent to the top portion 403. The light source module 100, the optical engine module 200 and the projection lens 300 are disposed in the housing 400 and adjacent to the top portion 403. The projection lens 300 projects the image beam L2 toward the bottom portion 401 of the housing 400 to the outside of the projection device 10.

Figure 3:
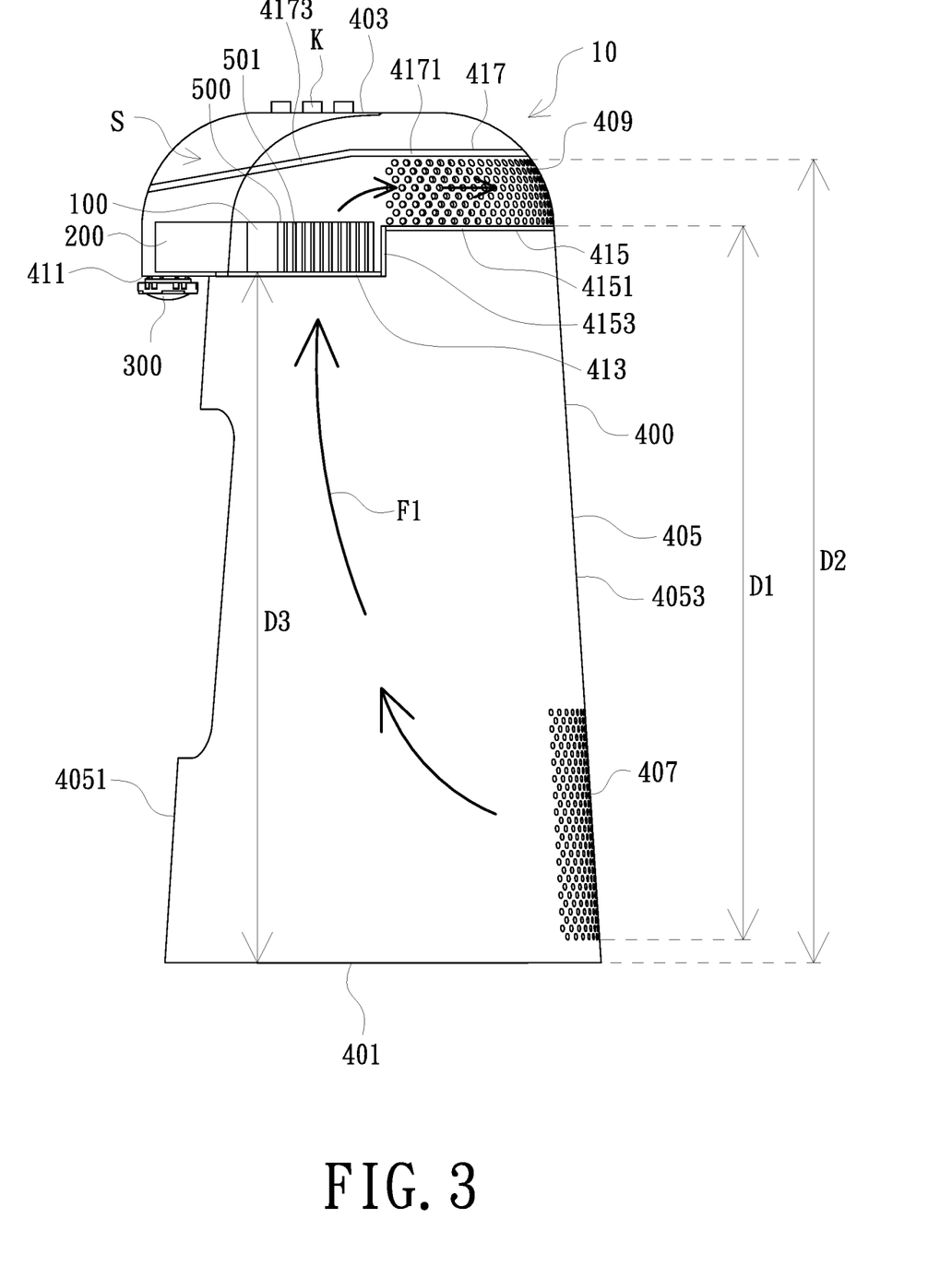
FIG. 3 is a schematic partial cross-sectional view of a projection device according to an embodiment of the invention.

FIG. 3 is a schematic partial cross-sectional view of the projection device 10 of FIG. 1, and specifically, FIG. 3 is a schematic partial cross-sectional view of the projection device 10 as viewed in a direction I shown in FIG. 1. The air inflow region 407 of the projection device 10 adjacent to the bottom portion 401 can allow air to enter, and the air exhaust region 409 adjacent the top portion 403 can allow air to exit. Therefore, the airflow F1 such as shown in FIG. 3 can be generated by the natural convection of heat, so as to achieve the effect that dissipating the heat inside the projection device 10. Moreover, the light source module 100, the optical engine module 200 and/or the projection lens 300 can dissipate heat through the airflow F1, thereby effectively reducing the optical quality degradation and component damage caused by heat. The projection device 10 of the embodiment uses the natural heat convection principle to dissipate heat. The so-called natural convection of heat is that heat is transferred from the high temperature to the low temperature during the heat exchange process, for example, heat is transferred from the heat dissipating component at high temperature to the air at low temperature, so that the temperature of the air rises and the density decreases, thereby naturally driving the airflow upward. Thus, a good heat dissipation effect can be obtained without providing a heat dissipating fan.

Specifically, in the embodiment, a distance D1 between a bottom edge of the air exhaust region 409 of the projection device 10 and a bottom edge of the air inflow region 407 may be greater than or equal to 250 mm, but the invention does not limit thereto. By configuring the air exhaust region 409 and the air inflow region 407 to have the distance D1 greater than or equal to 250 mm, the projection device 10 can dissipate heat by utilizing natural convection of heat more effectively.

In addition, as shown in FIG. 1, the air inflow area A1 of the air inflow region 407 of the projection device 10 of the embodiment may be, for example, greater than the air flow area A2 of the air exhaust region 409, but the invention is not limited thereto. By configuring the air inflow area A1 of the air inflow region 407 larger than the air exhaust area A2 of the air exhaust region 409, the projection device 10 can dissipate heat by utilizing natural convection of heat more effectively.

Specifically, as shown in FIG. 3, the side wall 405 of the projection device 10 has a projection side 4051 and a back side 4053 opposite to each other. The projection side 4051 has a raised edge 411 adjacent to the top portion 403, and the projection lens 300 projects the image beam L2 from the raised edge 411 toward the bottom portion 401 to a side of the projection side 4051. In FIG. 3, the raised edge 411 is, for example, a structure in which the housing 400 extends in a direction toward the projection side 4051, so that the projection lens 300 can project the image beam L2 toward the bottom portion 401.

In addition, the projection device 10 may further include, for example, a bracket 413. The bracket 413 is provided within the housing 400 and adjacent to the raised edge 411. In the embodiment, the projection device 10 carries the light source module 100, the optical engine module 200 and the projection lens 300 through the bracket 413 and the raised edge 411, but the invention is not limited thereto. Besides, the bracket 413 and the housing 400 may be integrally formed, or the bracket 413 and the housing 400 may be two separated structures. The types and configurations of the light source module 100, the optical engine module 200 and the projection lens 300 shown in FIG. 3 are merely illustrative and are not intended to limit the invention.

In the embodiment, the air exhaust region 409 is exemplified by being located on the back side 4053 of the side wall 405. The beauty of the projection device 10 is maintained by providing the air exhaust region 409 on the back side 4053, so that the user does not directly see the air exhaust region 409 when viewing the projected image. Moreover, the heat dissipated through the air exhaust region 409 is not directly transmitted to the user, thereby preventing the user from possible discomfort. Incidentally, the falling dust may be a problem if the air exhaust region is provided at the top portion 403 of the housing 400. The air exhaust region 409 of the embodiment is provided on the back side 4053 of the side wall 405, which can reduce the problem of dust falling. However, for utilizing the natural convection of heat for heat dissipation, the invention does not exclude that air exhaust region may be provided at the top portion 403 of the housing 400.

In addition, the projection device 10 may further include, for example, a heat dissipating component 500, but the invention is not limited thereto. The heat dissipating component 500 is connected to the light source module 100. In the embodiment, the heat dissipating component 500 may include, for example, a plurality of heat dissipating component fins 501 disposed at intervals. In the other words, two heat dissipating component fins 501 are formed an interval between each other.

Each of the heat dissipating fins 501 is disposed, for example, in a direction from the bottom portion 401 to the top portion 403 as shown in FIG. 3, but the invention is not limited thereto; that is, the heat dissipating fins may be disposed in other directions. Therefore, as shown in FIG. 3, the airflow F1 generated by natural convection of heat can flow through the heat dissipating component 500 to dissipate heat from the heat dissipating component 500. Thus, the heat generated by the light source module 100 can be effectively removed through the heat dissipating component 500. The invention does not limit the type and the number of heat dissipating elements 500.

Specifically, the inside of the housing 400 of the projection device 10 is provided with, for example, a first partition board 415 and a second partition board 417. The air exhaust region 409 is located between the first partition board 415 and the second partition board 417. The first partition board 415 has a first board portion 4151 connected to the side wall 405 and a connecting portion 4153 extending from an edge of the first board portion 4151 toward the bottom portion 401. The connecting portion 4153 is connected to the bracket 413. The second partition board 417 is located between the top portion 403 and the first partition board 415. The second partition board 417 has a second board portion 4171 and a guiding portion 4173, which are respectively connected to the side wall 405. The second board portion 4171 is opposite to the first board portion 4151, and the guiding portion 4173 extends obliquely downward from an edge of the second board portion 4171 to cover the light source module 100, the optical engine module 200 and the projection lens 300. Therefore, as shown in FIG. 3, an airflow passage connecting the air exhaust region 409 may be formed between the first partition board 415 and the second partition board 417. The airflow F1 generated by the natural convection of heat can flow through the airflow passage to the outside of the housing 400, so that the heat generated by the light source module 100 can be effectively dissipated. The structure and the form of the first partition board 415 and the second partition board 417 shown in FIG. 3 are merely illustrative and are not intended to limit the invention.

It should be noted that by providing the second partition board 417, a space S may be formed between the top portion 403 of the housing 400 and the second partition board 417. The space S can reduce the degree of heat generated by the light source module 100 conducts to the upper of the projection device 10, so as to avoid causing scalding or discomfort when the user touches the top portion 403 of the housing 400. When required components are disposed above the projection device 10 (for example, a button K shown in FIGS. 1 and 3), the space S can prevent the components from being damaged by heat, and may also preventing the user from possible discomfort during operating the components.

Specifically, as shown in FIG. 3, a height D2 of an upper edge of the air exhaust region 409 of the projection device 10 relative to the bottom portion 401 is higher than a height D3 of a bottom edge of the light source module 100 relative to the bottom portion 401. In general, the primary source of heat generated by the projection device 10 is the light source module 100, and the natural convection of heat is from bottom to top. Therefore, by configuring the air exhaust region 409 higher than the light source module 100, the projection device 10 can effectively utilize the natural convection of heat to dissipate heat.

Figure 4:
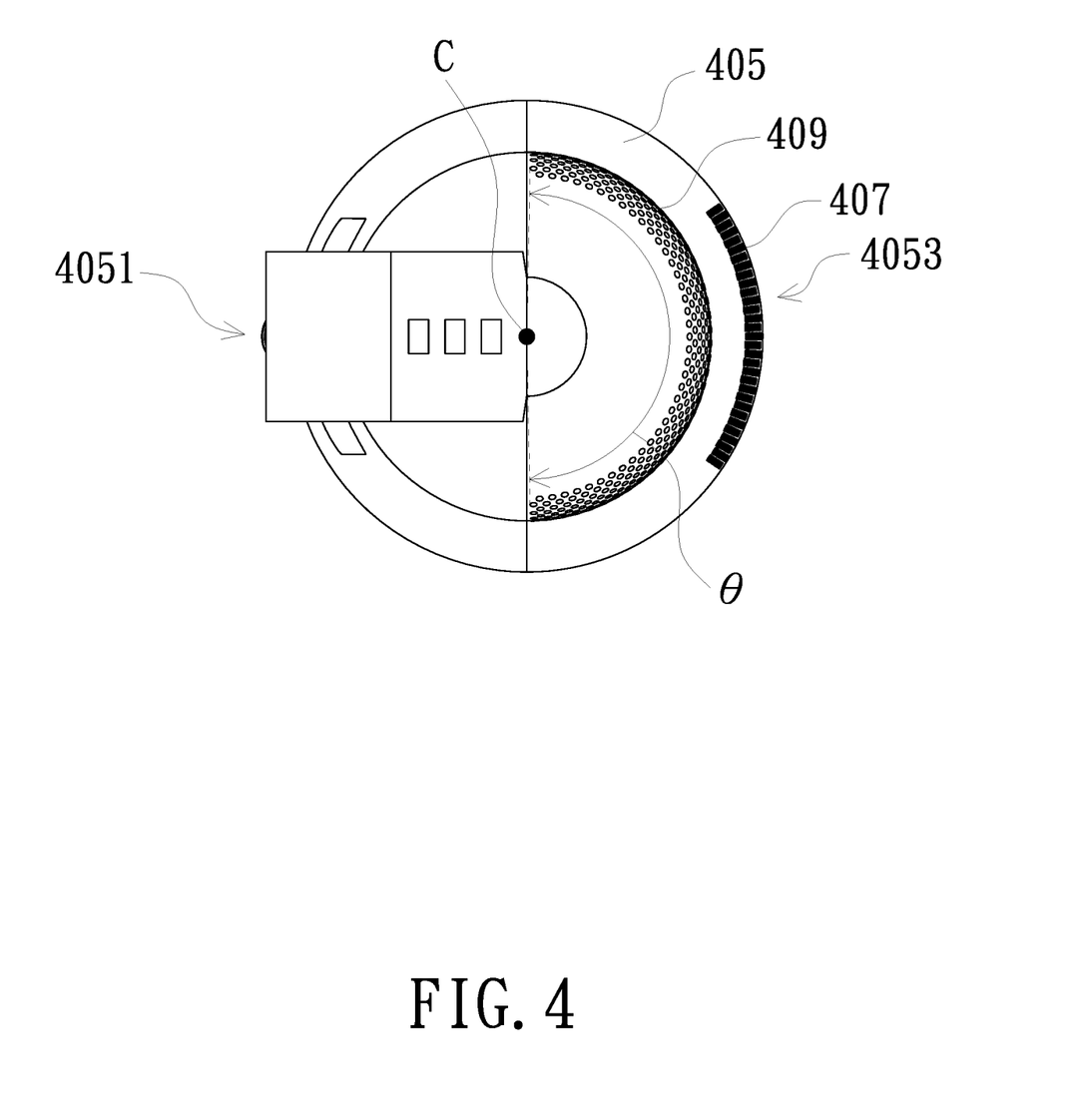
FIG. 4 is a schematic top view of a projection device according to an embodiment of the invention.

Please also refer to FIG. 4. FIG. 4 is a schematic top view of the projection device 10 shown in FIG. 1. In the embodiment, the air exhaust region 409 is distributed around a central axis C of the projection device 10, and an angle θ is formed by the central axis C as a vertex and two lines respectively from two ends of the air exhaust region 409 to the central axis C. The angle θ is between 60 degrees and 360 degrees, and preferably, the angle θ is between 120 degrees and 360 degrees. In FIG. 4, for example, the side wall 405 of the housing 400 is annular at the air exhaust region 409, and the air exhaust region 409 is curved, but the invention is not limited thereto. For example, the sidewall 405 of the housing 400 may also have a polygonal shape at the air exhaust region 409, and the air exhaust region 409 may also be polygonal. In FIG. 4, the angle θ formed by the central axis C as a vertex and two lines respectively from two ends of the air exhaust region 409 to the central axis C is approximately 180 degrees as an example. By providing the air exhaust region 409 distributed around the central axis C of the projection device 10, the projection device 10 can effectively utilize the natural convection of heat to dissipate heat.

Figure 5:
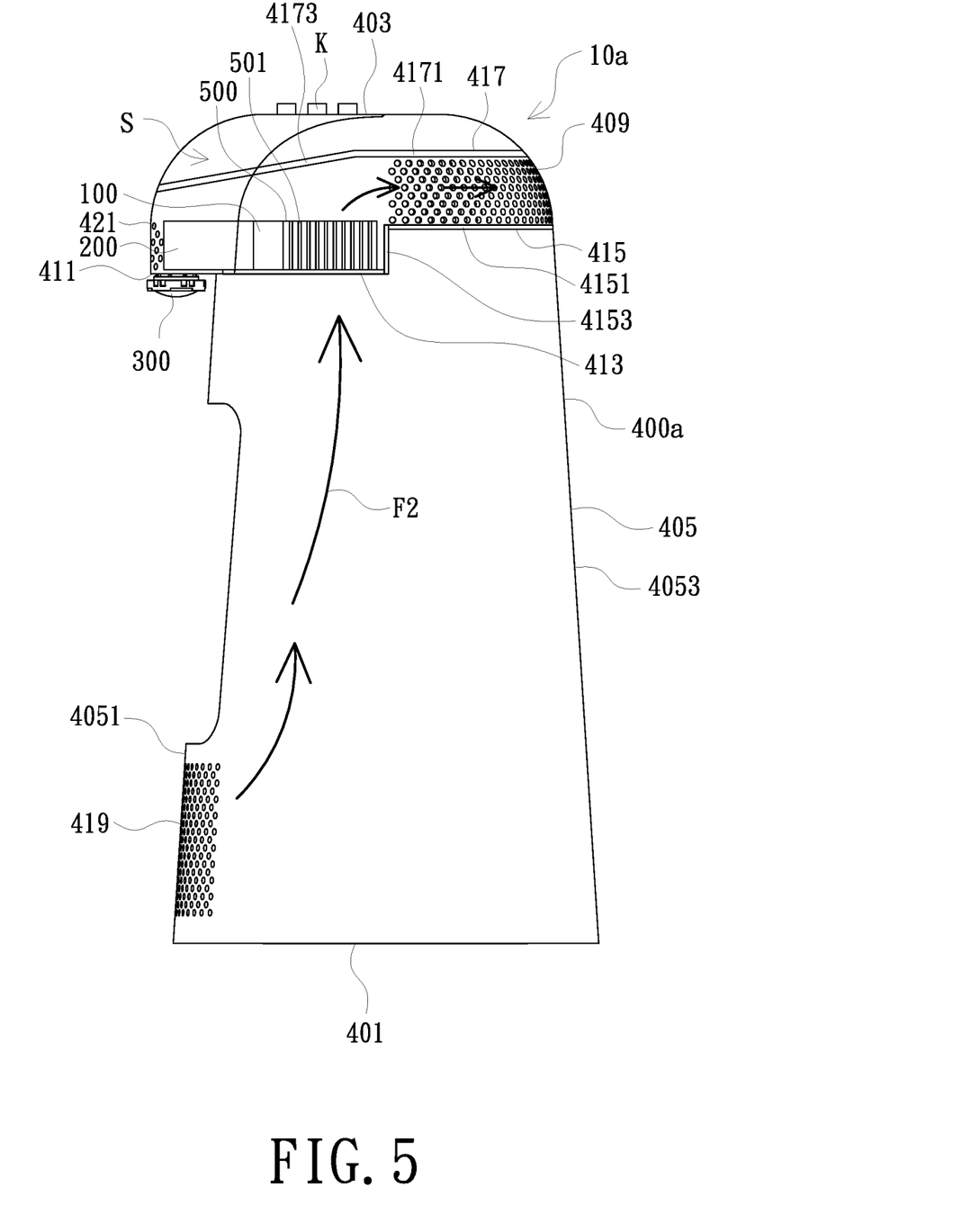
FIG. 5 is a schematic partial cross-sectional view of a projection device according to another embodiment of the invention.

Please refer to FIG. 5. FIG. 5 is a schematic partial cross-sectional view of a projection device according to another embodiment of the invention. The projection device 10a of the embodiment is similar in structure to the projection device 10 of the embodiment shown in FIG. 1 to FIG. 4, and has the same functions and effects. The embodiment differs from the previous embodiments in that the air inflow region 419 of the projection device 10a is located on the projection side 4051 of the side wall 405. Therefore, the airflow F2 shown in FIG. 5 can be generated by the natural convection of heat, for example, so as to achieve the effect of dissipating the heat inside the projection device 10a.

Figure 6:
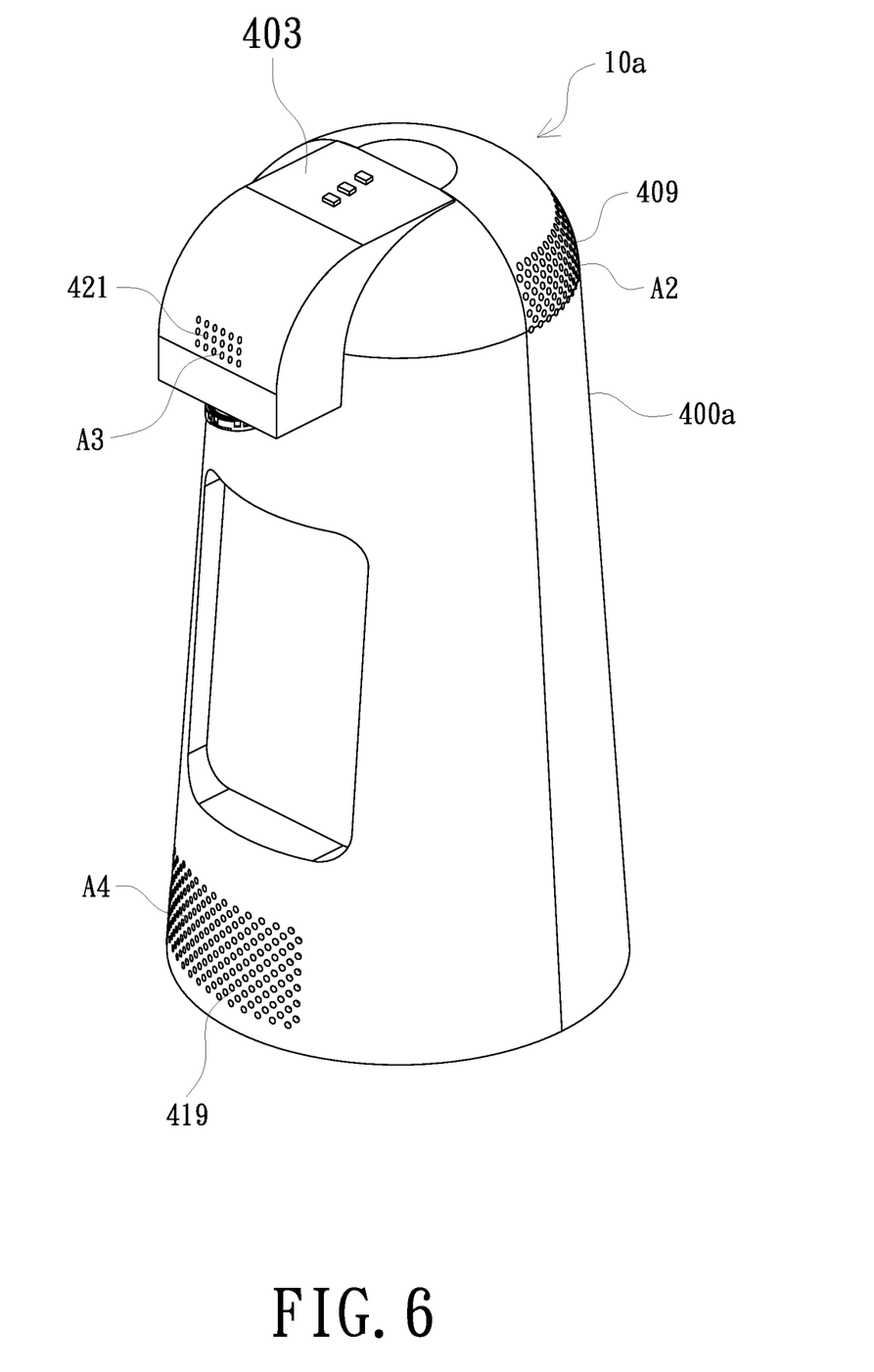
FIG. 6 is a schematic diagram of a projection device according to another embodiment of the invention.

Incidentally, in the embodiment, the housing 400a of the projection device 10a may further have an auxiliary air inflow region 421, but the invention is not limited thereto. Please also refer to FIG. 6. FIG. 6 is a schematic diagram of the projection device 10a shown in FIG. 5. The auxiliary air inflow region 421 may be, for example, adjacent to the top portion 403 of the housing 400a, and the air inflow area A4 of the air inflow region 419 plus the air inflow area A3 of the auxiliary air inflow region 421 is greater than the air exhaust area A2 of the air exhaust region 409. By configuring the air inflow area A4 of the air inflow region 419 plus the air inflow area A3 of the auxiliary air inflow region 421 larger than the air exhaust area A2 of the air exhaust region 409, the projection device 10a can effectively dissipate heat by natural convection of heat. The auxiliary air inflow region 421 may be disposed adjacent to, for example, the projection lens 300, but the invention is not limited thereto. Further, the housing 400 of the projection device 10 of the previous embodiment may also be provided with an auxiliary air inflow region 421.

Figure 7:
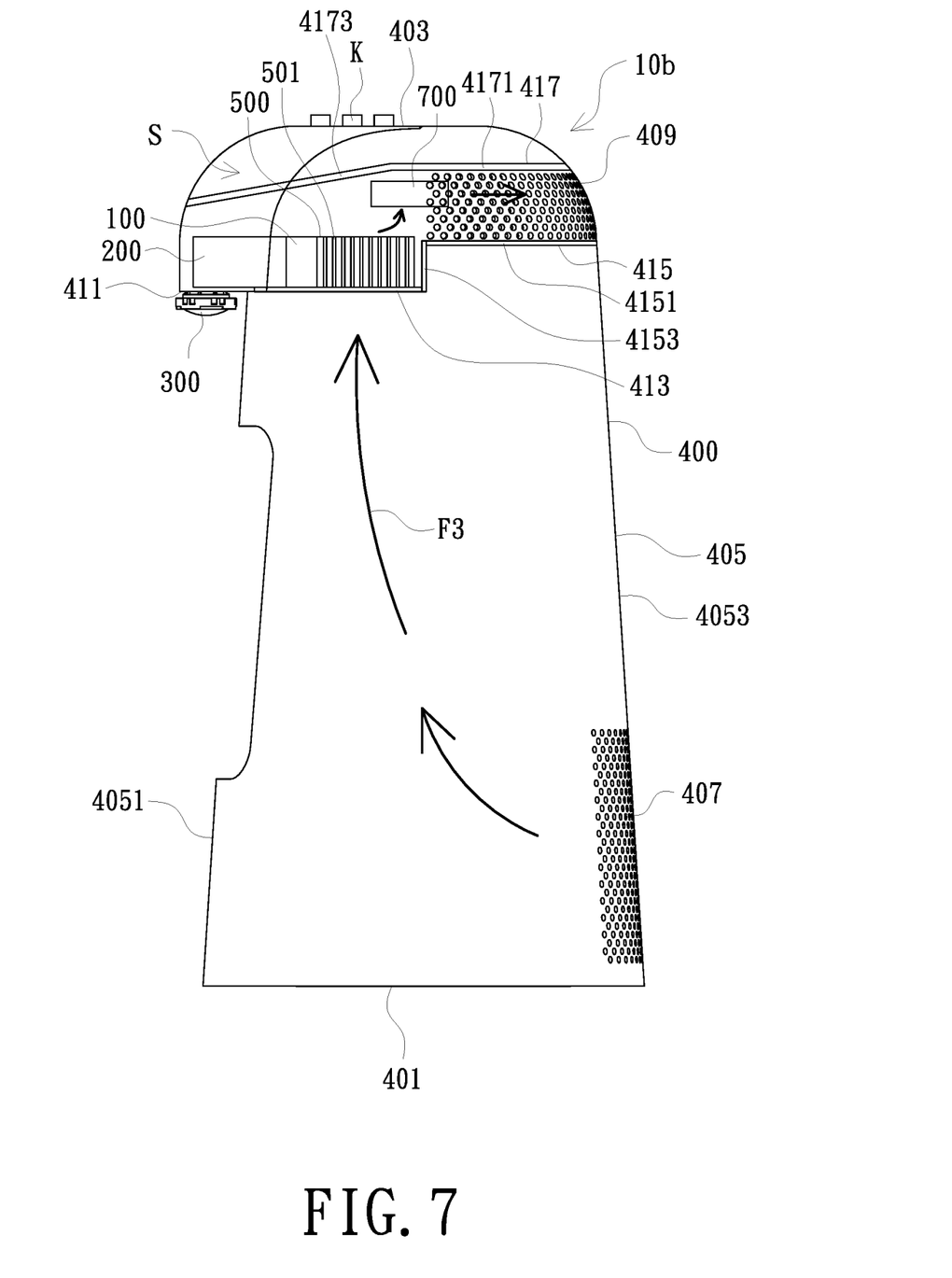
FIG. 7 is a schematic partial cross-sectional view of a projection device according to another embodiment of the invention.

Please refer to FIG. 7. FIG. 7 is a schematic partial cross-sectional view of a projection device according to another embodiment of the invention. The projection device 10b of the embodiment is similar in structure to the projection device 10 of the embodiment shown in FIG. 1 to FIG. 4, and has the same functions and effects. The embodiment differs from the previous embodiment in that the projection device 10b further includes a fan 700. The fan 700 is provided in the housing 400 and adjacent to the air exhaust region 409. Therefore, the airflow F3 shown in FIG. 7 can be generated by the natural convection of heat and the operation of the fan 700, so as to achieve the effect of dissipating heat inside the projection device 10b. By providing the fan 700, the heat dissipation of the projection device 10b can be more efficient. The invention does not limit the type and arrangement of the fan 700 as long as the fan 700 is adjacent to the air exhaust region 409 and able to direct airflow to the air exhaust region 409. The fan 700 can be implemented, for example, by a blower fan, but the invention is not limited thereto.

In summary, by providing an air inflow region adjacent to the bottom portion and an air exhaust region adjacent to the top portion, the projection device of the embodiments of the invention can effectively utilize the convection principle of heat to dissipate heat and avoid problems such as optical quality degradation or component damage.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first partition board, the second partition board, the first board portion and the second board portion are only used for distinguishing various elements and do not limit the number of the elements.

What is claimed is:

1. A projection device, comprising: a light source module, an optical engine module, a projection lens and a housing, wherein:
    the light source module is adapted to emit an illumination beam,
    the optical engine module is disposed on a transmission path of the illumination beam and adapted to receive the illumination beam and form an image beam,
    the projection lens is disposed on a transmission path of the image beam and adapted to receive the image beam and project the image beam to an outside of the projection device, and
    the housing has a bottom portion, a top portion opposite to the bottom portion, and a side wall connected between the bottom portion and the top portion, the side wall surrounds the top portion and the bottom portion, the side wall has an air inflow region adjacent to the bottom portion and an air exhaust region adjacent to the top portion, and wherein the light source module, the optical engine module and the projection lens are disposed in the housing and the light source module, the optical engine module and the projection lens are adjacent to the top portion, a distance between the projection lens and the bottom portion is greater than a distance between the projection lens and the top portion, and the projection lens is adapted to project the image beam to the outside of the projection device toward the bottom portion of the housing.

2. The projection device according to claim 1, wherein a distance between a bottom edge of the air inflow region and a bottom edge of the air exhaust region is greater than or equal to 250 mm.

3. The projection device according to claim 1, wherein an air inflow area of the air inflow region is larger than an air exhaust area of the air exhaust region.

4. The projection device according to claim 1, wherein the side wall has an projection side and a back side opposite to each other, the projection side has a raised edge adjacent to the top portion, and the projection lens is adapted to project the image beam from the raised edge toward the bottom portion to a side of the projection side.

5. The projection device according to claim 4, further comprising a bracket located in the housing and adjacent to the raised edge, wherein the bracket and the raised edge support the light source module, the optical engine module and the projection lens.

6. The projection device according to claim 5, further comprising at least one heat dissipating component connected to the light source module, wherein each of the at least one heat dissipating component comprises a plurality of heat dissipating fins disposed at intervals.

7. The projection device according to claim 5, wherein the housing is internally provided with a first partition board and a second partition board, the air exhaust region is located between the first partition board and the second partition board, the first partition board has a first board portion connected to the side wall and a connecting portion extending from an edge of the first board portion toward the bottom portion, the connecting portion is connected to the bracket, the second partition board is located between the top portion and the first partition board, the second partition board has a second board portion and a guiding portion respectively connected to the side wall, the second board portion is opposite to the first board portion, and the guiding portion extends obliquely downward from an edge of the second board portion and covers the light source module, the optical engine module and the projection lens.

8. The projection device according to claim 1, wherein a height of an upper edge of the air exhaust region relative to the bottom portion is higher than a height of a bottom edge of the light source module relative to the bottom portion.

9. The projection device according to claim 1, wherein the housing further has an auxiliary air inflow region adjacent to the top portion, and an air inflow area of the air inflow region plus an air inflow area of the auxiliary air inflow region is larger than an air exhaust area of the air exhaust region.

10. The projection device according to claim 1, wherein the side wall has a projection side and a back side opposite to each other, the projection lens is adapted to project the image beam to a side of the projection side, and the air exhaust region is located at least on the back side.

11. The projection device according to claim 10, wherein the air exhaust region is distributed around a central axis of the projection device, an angle is formed by two lines respectively from two ends of the air exhaust region to the central axis as a vertex, and the angle is between 60 degrees and 360 degrees.

12. The projection device according to claim 1, wherein the side wall has a projection side and a back side opposite to each other, the projection lens is adapted to project the image beam to a side of the projection side, and the air inflow region is located on the projection side and/or the back side.

13. The projection device according to claim 1, further comprising a fan disposed in the housing and adjacent to the air exhaust region.

* * * * *